United States Patent [19]

Nowlin et al.

[11] Patent Number: 5,602,067
[45] Date of Patent: *Feb. 11, 1997

[54] PROCESS AND A CATALYST FOR PREVENTING REACTOR FOULING

[75] Inventors: Thomas E. Nowlin, West Windsor; Frederick Y. Lo, Edison, both of N.J.; Ronald S. Shinomoto, Norristown, Pa.; Pradeep P. Shirodkar, Somerset, N.J.

[73] Assignee: Mobil Oil Corporation, Fairfax, Va.

[ * ] Notice: The term of this patent shall not extend beyond the expiration date of Pat. No. 5,332,704.

[21] Appl. No.: 333,685

[22] Filed: Nov. 3, 1994

Related U.S. Application Data

[60] Continuation-in-part of Ser. No. 229,516, Apr. 19, 1994, Pat. No. 5,473,028, which is a division of Ser. No. 997,421, Dec. 28, 1992, Pat. No. 5,332,706.

[51] Int. Cl.⁶ ............................. B01J 31/00; C08F 4/646
[52] U.S. Cl. ................ 502/104; 502/103; 502/107; 502/110; 502/117; 526/114; 526/116; 526/120
[58] Field of Search .................. 502/103, 110, 502/107, 117, 104

[56] References Cited

U.S. PATENT DOCUMENTS

| | | | |
|---|---|---|---|
| 3,135,809 | 6/1964 | Bosmajian . | |
| 3,950,269 | 4/1976 | Setterquist . | |
| 4,188,470 | 2/1980 | Collina et al. | 526/64 |
| 4,299,936 | 11/1981 | Candlin et al. | 526/119 |
| 4,324,691 | 4/1982 | Hartshorn et al. | 252/429 B |
| 4,338,424 | 7/1982 | Morita et al. | 526/65 |
| 4,404,344 | 9/1983 | Sinn et al. | 526/160 |
| 4,414,369 | 11/1983 | Kuroda et al. | 526/65 |
| 4,420,592 | 12/1983 | Kato et al. | 526/65 |
| 4,525,550 | 6/1985 | Warzelhan et al. | 526/116 |
| 4,530,914 | 7/1985 | Ewen et al. | 502/113 |
| 4,536,484 | 8/1985 | Lacombe et al. | 502/62 |
| 4,542,199 | 9/1985 | Kaminsky et al. | 526/160 |
| 4,568,659 | 2/1986 | Warzeihan et al. | 502/111 |
| 4,578,373 | 3/1986 | Graves | 502/113 |
| 4,658,078 | 4/1987 | Slaugh et al. | 585/512 |
| 4,665,047 | 5/1987 | Slaugh et al. | 502/108 |
| 4,701,432 | 10/1987 | Welborn, Jr. | 502/113 |
| 4,703,094 | 10/1987 | Raufast | 526/65 |
| 4,710,552 | 12/1987 | Bachl et al. | 526/116 |
| 4,752,597 | 6/1988 | Turner | 502/104 |
| 4,769,510 | 9/1988 | Kaminsky et al. | 585/512 |
| 4,791,180 | 12/1988 | Turner | 526/160 |
| 4,794,096 | 12/1988 | Ewen | 502/117 |
| 4,808,561 | 2/1989 | Welborn, Jr. | 502/104 |
| 4,814,540 | 3/1989 | Watanabe et al. | 585/523 |
| 4,820,786 | 4/1989 | Bacskai | 526/152 |
| 4,841,004 | 6/1989 | Kaminsky et al. | 526/160 |
| 4,871,704 | 10/1989 | Kohara et al. | 502/114 |
| 4,871,705 | 10/1989 | Hoel | 502/117 |
| 4,874,734 | 10/1989 | Kioka et al. | 502/104 |
| 4,874,880 | 10/1989 | Miya et al. | 556/53 |
| 4,892,851 | 1/1990 | Ewen et al. | 502/104 |
| 4,897,455 | 1/1990 | Welborn, Jr. | 526/129 |
| 4,912,075 | 3/1990 | Chang | 502/107 |
| 4,914,253 | 4/1990 | Chang | 585/523 |
| 4,921,825 | 5/1990 | Kioka et al. | 502/104 |
| 4,923,833 | 5/1990 | Kioka et al. | 502/9 |
| 4,925,821 | 5/1990 | Chang | 502/107 |
| 4,931,517 | 6/1990 | Fujita | 526/128 |
| 4,933,403 | 6/1990 | Kaminsky et al. | 526/160 |
| 4,935,397 | 6/1990 | Chang | 502/117 |
| 4,937,217 | 6/1990 | Chang | 502/111 |
| 4,937,301 | 6/1990 | Chang | 526/128 |
| 4,952,540 | 8/1990 | Kioka et al. | 502/9 |
| 4,962,248 | 10/1990 | Winter et al. | 585/12 |
| 4,962,262 | 10/1990 | Winter et al. | 585/512 |
| 5,001,205 | 3/1991 | Hoel | 526/128 |
| 5,006,500 | 4/1991 | Chang | 502/107 |
| 5,008,228 | 4/1991 | Chang | 502/111 |
| 5,023,388 | 6/1991 | Luker | 585/9 |
| 5,026,797 | 6/1991 | Takahashi | 526/124 |
| 5,032,562 | 7/1991 | Lo et al. | 502/111 |
| 5,034,549 | 7/1991 | Piotrowski et al. | 556/10 |
| 5,043,515 | 8/1991 | Slaugh et al. | 585/512 |
| 5,055,438 | 10/1991 | Canich | 502/117 |

(List continued on next page.)

FOREIGN PATENT DOCUMENTS

| 0515132 | 11/1992 | European Pat. Off. . |
| 0516458 | 12/1992 | European Pat. Off. . |

OTHER PUBLICATIONS

Sinn, Hansjorg et al., "Living Polymers on Polymerization with Extremely Productive Ziegler Catalysts", Angew. Chem. Int. Ed. Engl., (1980). pp. 390–392 no month available.

Kaminsky, Walter, "Influence of Hydrogen on the Polymerization of Ethylene with the Homogeneous Ziegler System bis(cyclopentadienyl)zirconiumdichloride/aluminoxane", Makromol. Chem., (1984), pp. 225–228 no month available.

Kaminsky, Walter, "Bix(cyclopentadienyl)zirkon– Verbindungen and Alminoxanals Ziegler–Katalysatoren fur die Polymerisation und Copolymerisation von Olefinen", Makromol. Chem., (1983), pp. 417–421 no month available.

Kaminsky, Walter, "Isotactic polymerization of propene with (n–1,1'–ethylenedi–4,5,6,7–tetrahydroindenyl)zirconium dichloride combined with methylaluminoxanee", Makromol. Chem., (1987), pp. 305–310 no month available.

Furtek, A. B., "Ultra Strength Polyethylene Resins Produced In A Fluid–Bed Process Utilizing Metallocene–Based Catalysts", Catalyst Consultants, Inc., 125–137, May 1993.

*Primary Examiner*—Glenn A. Caldarola
*Assistant Examiner*—Elizabeth D. Wood
*Attorney, Agent, or Firm*—Marina V. Schneller

[57] ABSTRACT

A support containing methylalumoxane and derivatives thereof is described which is formed by an incipient impregnation technique. The most preferred support is silica. Incipient impregnation in accordance with the invention provides a supported alumoxane, methylalumoxane, which substantially eliminates the problem of fluidized bed reactor fouling when methylalumoxane is introduced into the reactor during its operation. In accordance with the invention, the process comprises providing methylalumoxane activated metallocene compound in particulate form as catalysts in fluidized bed gas phase operation.

44 Claims, 1 Drawing Sheet

U.S. PATENT DOCUMENTS

| | | | |
|---|---|---|---|
| 5,057,475 | 10/1991 | Canich et al. | 502/104 |
| 5,066,631 | 11/1991 | Sangokoya et al. | 502/152 |
| 5,075,394 | 12/1991 | McDaniel et al. | 526/96 |
| 5,077,255 | 12/1991 | Welborn, Jr. | 502/104 |
| 5,084,534 | 1/1992 | Welborn, Jr. et al. | 526/160 |
| 5,086,024 | 2/1992 | Crapo et al. | 502/117 |
| 5,086,135 | 2/1992 | Kissin | 526/151 |
| 5,087,788 | 2/1992 | Wu | 585/512 |
| 5,091,352 | 2/1992 | Kioka et al. | 502/103 |
| 5,122,491 | 6/1992 | Kioka et al. | 502/117 |
| 5,126,303 | 6/1992 | Resconi et al. | 502/117 |
| 5,132,262 | 7/1992 | Rieger et al. | 502/117 |
| 5,132,381 | 7/1992 | Winter et al. | 526/160 |
| 5,145,819 | 9/1992 | Winter et al. | 502/117 |
| 5,147,949 | 9/1992 | Chang | 526/129 |
| 5,157,008 | 10/1992 | Sangokoya et al. | 502/111 |
| 5,171,799 | 12/1992 | Kioka et al. | 26/127 |
| 5,171,871 | 12/1992 | Miyashita | 556/27 |
| 5,171,919 | 12/1992 | Watanabe et al. | 585/523 |
| 5,196,496 | 3/1993 | Galimberti et al. | 526/348.6 |
| 5,198,399 | 3/1993 | Hoff et al. | 502/111 |
| 5,200,379 | 4/1993 | McDaniel et al. | 502/154 |
| 5,206,197 | 4/1993 | Campbell, Jr. | 502/103 |
| 5,206,199 | 4/1993 | Kioka et al. | 502/117 |
| 5,208,304 | 5/1993 | Waymouth | 526/164 |
| 5,216,095 | 6/1993 | Dolle et al. | 526/127 |
| 5,223,465 | 6/1993 | Ueki et al. | 502/117 |
| 5,225,500 | 7/1993 | Elder et al. | 526/127 |
| 5,234,878 | 8/1993 | Tsutsui et al. | 502/103 |
| 5,235,081 | 8/1993 | Sangokoya | 556/179 |
| 5,238,891 | 8/1993 | Miro | 502/104 |
| 5,238,892 | 8/1993 | Chang | 502/111 |
| 5,240,894 | 8/1993 | Burkhardt et al. | 502/108 |
| 5,241,025 | 8/1993 | Hlatky et al. | 526/129 |
| 5,242,876 | 9/1993 | Shamshoum et al. | 502/113 |
| 5,279,999 | 1/1994 | DeBoer et al. | 502/117 |
| 5,281,679 | 1/1994 | Jejelowo et al. | 526/114 |
| 5,296,565 | 3/1994 | Ueda et al. | 526/114 |
| 5,304,523 | 4/1994 | Razavi | 502/152 |
| 5,308,811 | 5/1994 | Suga et al. | 502/62 |
| 5,308,815 | 5/1994 | Sangokoya | 502/104 |
| 5,308,816 | 5/1994 | Tsutsui et al. | 502/108 |
| 5,317,036 | 5/1994 | Brady, III et al. | 523/223 |
| 5,324,800 | 6/1994 | Welborn, Jr. et al. | 526/160 |
| 5,332,706 | 7/1994 | Nowlin et al. | 502/117 |

FIG. 1

PROCESS AND A CATALYST FOR PREVENTING REACTOR FOULING

CROSS-REFERENCE TO RELATED APPLICATIONS

This is a continuation-in-part of Ser. No. 08/229,516, filed Apr. 19, 1994 and now U.S. Pat. No. 5,473,028 which is a divisional of Ser. No. 07/997,421, filed Dec. 28, 1992, (now U.S. Pat. No. 5,332,706).

FIELD OF THE INVENTION

The invention relates to modifications and improvements in low pressure fluidized bed gas phase systems for the polymerization and copolymerization of ethylene, undertaken in the presence of catalysts comprising metallocenes of transition metals. The invention relates to eliminating reactor fouling and to maintaining the continuous operation of the distributor plate in the fluidized bed gas phase reactor undertaken in the presence of catalysts comprising metallocenes of transition metals. Moreover, the invention relates to maintaining the continuous polymerization and copolymerization of ethylene in the fluidized bed reactor.

BACKGROUND OF THE INVENTION

Polyethylene is produced commercially in a gas phase reaction in the absence of solvents by employing selected chromium and titanium-containing catalysts under specific operating conditions in a fluidized bed process. The products of those original processes exhibited narrow-to-broad molecular weight distribution. To be commercially useful in the gas phase fluidized bed process, the catalyst must exhibit high activity, with concomittant high catalyst productivity, because gas phase process systems do not include catalyst residue removal procedures. Accordingly, catalyst residue in the polymer product must be so small that it can be left in the polymer without causing any undue problems in the fabrication and/or to the ultimate consumer. To this end, the patent literature is replete with developments of new catalysts, of high activity with corresponding high productivity values.

The use of metallocene compounds which contain transition metals as catalysts for polymerization and copolymerization of ethylene is one of those developments. Metallocenes can be described by the empirical formula $Cp_mMA_nB_p$. These compounds in combination with methylalumoxane (MAO) have been used to produce olefin polymers and copolymers, such as ethylene and propylene homopolymers, ethylene-butene and ethylene-hexene copolymers, e.g., see Kaminsky et al, U.S. Pat. No. 4,542,199 and Sinn et al, U.S. Pat. No. 4,404,344, the entire contents of both of which are incorporated herein by reference. Unlike traditional titanium-and vanadium-based Ziegler-Natta catalysts, a metallocene, e.g. a zirconocene catalyst, free of titanium- and vanadium-components, produce resins with very narrow molecular weight distributions (determined as Melt Flow Ratio (MFR) which is the high load melt index of the polymer divided by the melt index of the polymer) of 15 to 24, versus MFR of 25 to 30 for titanium-based catalysts and with homogeneous short-chain branching distributions. When traditional titanium- and vanadium-based catalysts are used to copolymerize ethylene and higher alpha-olefins, the higher α-olefin is incorporated in polymer chains nonuniformly, and most of the higher α-olefin resides in the relatively shortest polymer chains. This is referred to as heterogeneous branching distribution. With zirconocene catalyst, however, the branching distribution is essentially independent of chain length. This is referred to as homogeneous branching distribution. LLDPE resins produced with zirconocene catalysts have superior properties. These resins can be used to make films with significantly better clarity and impact strength. Extractables of such resins are much lower and the balance of properties in the film between the machine and transverse directions is excellent. More recently, as exemplified in U.S. Pat. No. 5,032,562, metallocene catalysts containing a second transition metal, such as titanium have been developed which produce bimodal molecular weight distribution products, having a relatively high molecular weight component and a relatively lower molecular weight component. The development of a catalyst which can produce bimodal products in a single reactor is significant per se. That development also provides a commercial alternative to processes which require two or more reactors to produce bimodal MWD polymer with production of one of the molecular weight components in a first reactor and transfer of that component to a second reactor and completion of the polymerization with production of the other component of different molecular weight.

Methylalumoxane (MAO) is used as co-catalyst with metallocene catalysts. The class of alumoxanes comprises oligomeric linear and/or cyclic alkylalumoxanes represented by the formula:

R—(Al(R)—O)$_n$—AlR$_2$ for oligomeric, linear alumoxanes and (—Al(R)—O—)$_m$ for oligomeric cyclic alumoxanes wherein n is 1–40, preferably 10–20, m is 3–40, preferably 3–20 and R is a $C_1$–$C_8$ alkyl group and preferably methyl. Methylalumoxane is commonly produced by reacting trimethylaluminum with water or with hydrated inorganic salts, such as $Cu(SO_4)5H_2O$ or $Al_2(SO_4)_3.5H_2O$. Methylalumoxane can be also generated in situ in polymerization reactors by adding to the reactor trimethylaluminum and water or water-containing inorganic salts. MAO is a mixture of oligomers with a very wide distribution of molecular weights and usually with an average molecular weight of about 1200. MAO is typically kept in solution in toluene. While the MAO solutions remain liquid at fluidized bed reactor temperatures, the MAO itself is a solid at room temperature.

Most of the experiments reported in the literature relating to methylalumoxane used as a cocatalyst with metallocene catalysts are undertaken in a slurry or solution process, rather than in a gas phase fluidized bed reactor process.

It was found that the metallocene compound must contact the MAO cocatalyst while MAO is in solution in order for the metallocene compound to be activated in the fluidized bed reactor. Moreover, it was discovered that extensive reactor fouling results when MAO solutions are fed directly into the gas phase reactor in large enough quantities to provide this liquid contact. The fouling occurs because the MAO solution forms a liquid film on the interior walls of the reactor. The metallocene compound is activated when it comes into contact with this liquid film, and the activated catalyst reacts with ethylene to form a polymer coating which grows larger in size until the reactor is fouled. In addition, since substantially all of the activation takes place on the walls, the MAO is not uniformly distributed to the catalyst particles. The resulting non-homogeneous polymerization gives low catalyst activity and poor product properties.

SUMMARY OF THE INVENTION

In accordance with the invention, it was found that the metallocene compound must contact the alumoxane, e.g.

MAO, while MAO is in solution in order for the metallocene to be activated in the fluidized bed reactor. Moreover, in accordance with the invention, it was discovered that extensive reactor fouling results when MAO solutions are fed directly into the gas phase reactor in large enough quantities to provide this liquid contact. The fouling occurs because the MAO solution forms a liquid film on the interior walls of the reactor. The metallocene compound is activated when it comes into contact with this liquid film, and the activated catalyst reacts with ethylene to form a polymer coating which grows larger in size until the reactor is fouled. In addition, since substantially all of the activation takes place on the walls, the MAO is not uniformly distributed to the catalyst particles. The resulting non-homogeneous polymerization gives low catalyst activity and poor product properties.

The problems invoked by the use of an alumoxane, methylalumoxane, in catalyst production are addressed by a process for forming a carrier material impregnated with alumoxane and derivatives thereof, comprising (1) providing a carrier, which has hydroxyl groups, which is porous and has a particle size of 1 to 200 microns, having pores which have an average diameter of 50 to 500 Angstroms and having a pore volume of 0.5 to 5.0 cc/g of carrier;

(2) providing a volume of a solution comprising a alumoxane and a solvent therefor, wherein the concentration of alumoxane, expressed as Al weight percent is 5 to 20;

wherein the alumoxane provides aluminum in an amount sufficient to provide a ratio of Al to silica, i.e., Al/silica (wt/wt) ranging from 0.10 to 0.40;

(3) contacting the said solution with the carrier and allowing the solution to impregnate the pores of the carrier, without forming a slurry of the carrier in said solution having a pore volume of 0.5 to 5.0 cc/g, containing alumoxane within said pores.

(4) after said contacting, recovering a dry impregnated carrier.

Accordingly, the invention includes the foregoing process, the product(s) thereof, the catalysts formed therefrom, and the polymerizations and copolymerizations achieved thereby.

DETAILED DESCRIPTION OF THE INVENTION

Ethylene polymers, as well as copolymers of ethylene with one or more $C_3$–$C_{10}$ alpha-olefins, can be produced in accordance with the invention. Thus, copolymers having two monomeric units are possible as well as terpolymers having three monomeric units. Particular examples of such polymers include ethylene/1-butene copolymers, ethylene/1-hexene copolymers and ethylene/4-methyl-1-pentene copolymers.

Hydrogen may be used as a chain transfer agent in the polymerization reaction of the present invention. The ratio of hydrogen/ethylene employed will vary between about 0 to about 2.0 moles of hydrogen per mole of ethylene in the gas phase. Any other gas inert to the catalyst and reactants can also be present in the gas stream.

Ethylene/1-butene and ethylene/1-hexene copolymers are the most preferred copolymers polymerized in the process of and with the catalyst of this invention. The ethylene copolymers produced in accordance with the present invention preferably contain at least about 70 percent by weight of ethylene units. The cocatalyst of this invention can also be used with the catalyst precursor of this invention to polymerize propylene and other alpha-olefins and to copolymerize them. The structure of alpha-olefin polymers prepared with the cocatalyst and the catalyst precursor of this invention depends on the structure of the cyclopentadienyl ligands attached to the metal atom in the catalyst precursor molecule. The cocatalyst compositions of this invention can also be used with the catalyst precursors of this invention to polymerize cyclic-olefins such as cyclopentene.

In one embodiment, the catalyst of the invention exhibits high activity for polymerization of ethylene and higher alpha-olefins and allows the synthesis of ethylene polymers and copolymers with a relatively narrow molecular weight distribution and homogeneous branching distribution. The catalyst of the invention exhibits high activity for copolymerization of ethylene and higher alpha-olefins. The molecular weight distribution is determined as MFR which ranges from 15 to 25, in polymerizations of the invention. Branching distribution in ethylene copolymers is evaluated on the basis of the resin's melting point. Relatively homogeneous branching distribution is one in which the melting point of the polymer ranges from 100° to 140° C., depending on comonomer composition. In this embodiment, the catalyst of the invention contains only one source of transition metal, a metallocene compound.

In another embodiment of the invention, the catalyst of the invention exhibits high activity for polymerization of ethylene and higher alpha-olefins and allows the synthesis of ethylene polymers and copolymers with a broad/bimodal molecular weight distribution and generally, bimodal molecular weight distribution with a relatively high molecular weight component and with a relatively lower molecular weight component in the resin. The molecular weight distribution of the broad/bimodal resin, expressed as MFR, is about 50 to about 250. In this embodiment, the catalyst of the invention comprises two transition metal compounds, only one of the transition metal compounds being a metallocene.

The Fluidized Bed Reactor

Figure 1:
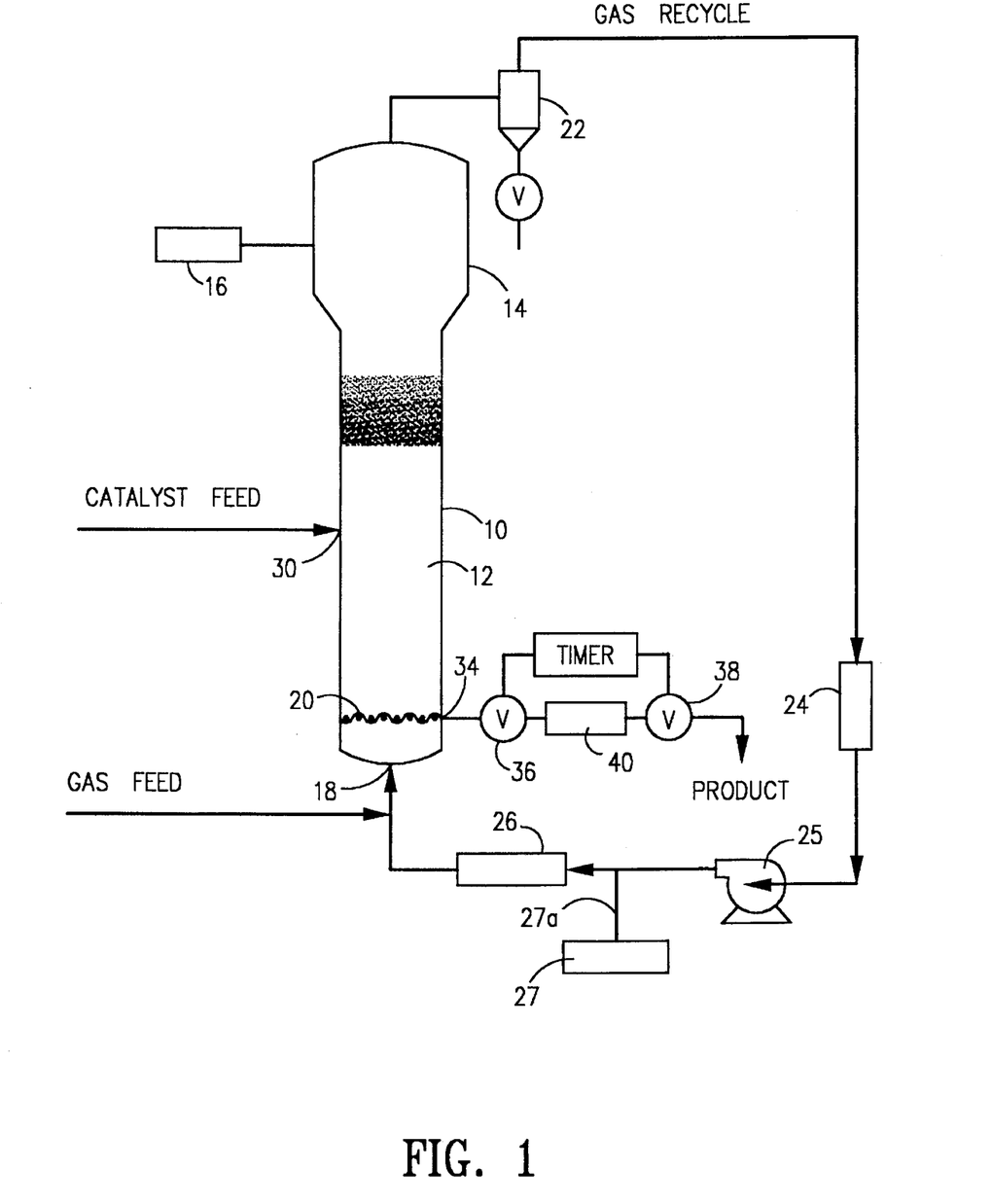
FIG. 1 is a schematic drawing of a fluidized bed reactor for gas phase polymerization of ethylene.

A fluidized bed reaction system which can be used in the practice of the process of the present invention is shown in FIG. 1. With reference thereto, the reactor 10 consists of a reaction zone 12, a velocity reduction zone 14 and the distributor plate 20. Although fouling can occur in all of the cold areas (areas in a reactor at a temperature which is less than the temperature at which any component(s), in the gas phase reactor are liquid rather than gaseous) distributor plate fouling is the one most easily detected, since it results in a rapid increase in the pressure drop across the distributor plate due to flow restriction. Such flow restrictions also result in changing fluidization patterns and contribute to reactor wall fouling. The lowest temperature in the reactor loop is in the reactor inlet beneath the distributor plate. Other areas representing the coldest sections in the fluidized bed reactor system include the cooler and piping between the cooler and the bottom head.

The reaction zone 12 comprises a bed of growing polymer particles and a minor amount of catalyst particles fluidized by the continuous flow of polymerizable and modifying gaseous components. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization,, C. Y. Wen and Y. H. Yu, "Mechanics of Fluidization", *Chemical Engineering Progress Symposium Series*, Vol. 62, p. 100–111 (1966). The distribution plate 20 serves the purpose of diffusing recycle gas through the bed at a rate sufficient to maintain fluidization at the base of the bed. Fluidization is achieved by a high rate of gas recycle to and through the bed, typically in the order of about 50 times the rate of feed of make-up gas. Make-up gas is fed to the bed at a rate equal to the rate at which particulate polymer product is formed by reaction. The composition of the make-up gas is determined by a gas analyzer 16 positioned above the bed. The composition of the make-up gas is continuously adjusted to maintain an essentially steady state gaseous composition within the reaction zone.

The portion of the gas stream which does not react in the bed (the recycle gas) passes a velocity reduction zone 14 where entrained particles are given an opportunity to drop back into the bed, through a cyclone 22, through a filter 24 (optionally) and is compressed in a compressor 25, passes through a heat exchanger 26 and is returned to the bed. The distribution plate 20 serves the purpose of diffusing recycle gas through the bed at a rate sufficient to maintain fluidization. The plate may be a screen, slotted plate, perforated plate, a plate of the bubble cap type, and the like. The elements, of the plate may all be stationary, or the plate may be of the mobile type disclosed in U.S. Pat. No. 3,298,792.

Conditions in the Fluidized Bed Reactor for the Gas Phase Polymerization and Copolymerization of Ethylene It is essential to operate the fluidized bed reactor at a temperature below the sintering temperature of the polymer particles. For the production of ethylene copolymers in the process of the present invention an operating temperature of about 30° to 115° C. is preferred, and a temperature of about 75° to 95° C. is most preferred. Temperatures of about 75°0 to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96.

The fluidized bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a point above the distribution plate at a rate equal to its consumption. Since the catalysts used in the practice of this invention are highly active, injection of the fully activated catalyst into the area below the distribution plate may cause polymerization to begin there and eventually cause plugging of the distribution plate. Injection into the bed, instead, aids in distributing the catalyst throughout the bed and precludes the formation of localized spots of high catalyst concentration.

The production rate of polymer in the bed is controlled by the rate of catalyst injection. Since any change in the rate of catalyst injection changes the rate of generation of the heat of reaction, the temperature of the recycle gas is adjusted to accommodate the change in rate of heat generation. Complete instrumentation of both the fluidized bed and the recycle gas cooling system is, of course, necessary to detect any temperature change in the bed so as to enable the operator to make a suitable adjustment in the temperature of the recycle gas.

Since the rate of heat generation is directly related to product formation, a measurement of the temperature rise of the gas across the reactor (the difference between inlet gas temperature and exit gas temperature) is determinative of the rate of particulate polymer formation at a constant gas velocity.

Under a given set of operating conditions, the fluidized bed is maintained at essentially a constant height by withdrawing a portion of the bed as product at a rate equal to the rate of formation of the particulate polymer product.

Catalyst Composition

Catalysts which contain only one transition metal in the form of a metallocene have an activity of at least about 1,000 g polymer/g catalyst or at least about 250 kg polymer/g transition metal. Catalysts which contain two transition metals, one in the form of a metallocene and one transition metal in the form of a non-metallocene, have an activity of at least about 1,000 g polymer/g catalyst or about 100 kg polymer/g of each transition metal.

The bimetallic catalysts of the invention comprise, optionally, a cocatalyst comprising an aluminum alkyl compound, such as a trialkyl aluminum free of alumoxane, and a catalyst precursor comprising a carrier, an alumoxane and at least one metallocene; in one embodiment the catalysts further include a non-metallocene transition metal compound.

The carrier material is a solid, particulate, porous, preferably inorganic material, such as an oxide of silicon and/or of aluminum and/or of Mg. The carrier material is used in the form of a dry powder having an average particle size of from about 1 micron to about 250 microns, preferably from about 10 microns to about 150 microns. If necessary, the treated carrier material may be sieved to insure that the particles of the ultimate carrier-catalyst containing composition are no larger than about 250 microns. This is highly desirable in the embodiment of the invention, in which the catalyst contains only one transition metal in the form of a metallocene and which is used to form narrow molecular weight distribution LLDPE, to reduce gels. The surface area of the carrier is at least about 3 square meters per gram ($m^2/g$), and preferably at least about 50 $m^2/g$ up to about 350 $m^2/g$. The carrier material should be dry, that is, free of absorbed water. Drying of the carrier material can be effected by heating at about 100° C. to about 1000° C., preferably at about 200° C.–600° C. When the carrier is silica, it is heated to at least 200° C., preferably about 250° C. for catalysts containing only a metallocene compound and 600° C. for catalysts containing a metallocene compound and a non-metallocene transition metal compound. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 250° C.–600° C. for about 16 hours to achieve a surface hydroxyl group concentration of at least about 0.7 millimoles per gram (mmol/g). The silica of the most preferred embodiment is a high surface area, amorphous silica (surface area.=300 m²/g; pore volume of 1.65 cm³/g), and it is a material marketed under the tradenames of Davison 952 or Davison 955 by the Davison Chemical Division of W. R. Grace and Company. The silica is in the form of spherical particles, e.g., as obtained by a spray-drying process.

To form catalysts of the invention, some catalyst precursor components can be dissolved with alumoxane and impregnated into the carrier. In a unique process, the carrier material is impregnated with a solid alumoxane, preferably methylalumoxane, in a process described below. The class of alumoxanes comprises oligomeric linear and/or cyclic alkylalumoxanes represented by the formula:

R—(Al(R)—O)$_n$—AlR$_2$ for oligomeric, linear alumoxanes and (—Al(R)—O—)$_m$ for oligomeric cyclic alumoxane wherein n is 1–40, preferably 10–20, m is 3–40, preferably 3–20 and R is a $C_1$–$C_8$ alkyl group and preferably methyl. MAO is a mixture of oligomers with a very wide distribution of molecular weights and usually with an average molecular weight of about 1200. MAO is typically kept in solution in toluene. While the MAO solutions remain liquid at fluidized bed reactor temperatures, the MAO itself is a solid.

Although the alumoxane can be impregated into the carrier at any stage of the process of catalyst preparation, the preferred stage of alumoxane incorporation will depend on the ultimate catalyst sought to be synthesized. In a preferred embodiment, of alumoxane incorporation into the carrier, one of the controlling factors in the alumoxane incorporation into the carrier material catalyst synthesis is the pore volume of the silica. In this preferred embodiment, the process of impregnating the carrier material is by infusion of the alumoxane solution, without forming a slurry of the carrier material, such as silica, in the alumoxane solution. The volume of the solution of the alumoxane is sufficient to fill the pores of the carrier material without forming a slurry of the solution and the silica. To do this preferably, the maximum volume of the alumoxane solution is, does not exceed, the total pore volume of the carrier material sample. However, it has been determined that no slurry will form when the volume of the solution is 200% of the total pore volume of the sample of silica. Accordingly the volume of the alumoxane can range from less than the total pore volume up to twice the total pore volume of the silica, without a silica-alumoxane slurry forming. However, it is preferred to use as a maximum volume of alumoxane solution that is equal to; or less than, the total pore volume of silica. We have found that as the volume of the solution exceeds the total pore volume of the carrier sample, formation, and increase of that formation, of a crust of catalyst on the outside of particle occurs; this layer is detectable by microscopy. As the amount of alumoxane (e.g. methylalumoxane) layer on the particle increases, e.g. zirconium efficiency (activity and productivity) decreases. Although there is no slurry formation, when the volume of the impregnant alumoxane solution employed is up to 200% of the total pore volume of the carrier, preferably the volume is less than 200% of the total pore volume of the carrier, more preferably the volume of that solution is less than 150% of the total pore volume of the carrier. That maximum volume of the alumoxane solution insures that no slurry of silica is formed. Accordingly, if the pore volume of the carrier material is 1.65 cm³/g, then the volume of alumoxane will be equal to or less than 1.65 cm³/g of carrier material. As a result of this proviso, the impregnated carrier material will appear dry immediatedly following impregnation although the pores of the carrier will be filled with inter alia solvent.

Solvent may be removed from the alumoxane impregnated pores of the carrier material by heating and/or under a positive pressure induced by an inert gas, such as nitrogen. If employed, the conditions in this step are controlled to reduce, if not to eliminate, agglomeration of impregnated carrier particles and/or crosslinking of the alumoxane at temperatures above 30° to below about 60° C. In this step, solvent can be removed by evaporation effected at relatively low elevated temperatures of above about 40° and below about 50° to obviate agglomeration of catalyst particles and crosslinking of the alumoxane. Although solvent can be removed by evaporation at relatively higher temperatures than that defined by the range above 40° and below about 50° C., very short heating times schedules must be employed to obviate agglomeration of catalyst particles, crosslinking of the alumoxane, or deactivation of the resulting catalyst precursor.

In a preferred embodiment, the metallocene is added to the solution of the alumoxane, prior to impregnating the carrier with the solution. Again the preferred maximum volume of the alumoxane solution also including the metallocene is the total pore volume of the carrier material sample. The mole ratio of alumoxane provided aluminum, expressed as Al, to metallocene metal expressed as M (e.g. Zr), ranges from 50 to 500, preferably 75 to 300, and most preferably 100 to 200. An added advantage of the present invention is that this Al:Zr ratio can be directly controlled. In a preferred embodiment the alumoxane and metallocene compound are mixed together at a temperature of about 20° to 80° C., for 0.1 to 6.0 hours, prior to use in the infusion step. The solvent for the metallocene and alumoxane can be appropriate solvents, such as aromatic hydrocarbons, halogenated aromatic hydrocarbons, ethers, cyclic ethers or esters, preferably it is toluene.

The metallocene compound has the formula $Cp_mMA_nB_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a polysubstituted cyclopentadienyl group. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroinenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as —CH$_2$—, —CH$_2$—CH$_2$—, —CR'R"— and —CR'R"—CR'R"— where R' and R" are short alkyl groups or hydrogen, —Si(CH$_3$)$_2$—, Si(CH$_3$)$_2$—CH$_2$—CH$_2$—Si(CH$_3$)$_2$— and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight,chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, bis(dimethylcyclopentadienyl) zirconium dichloride, cyclopentadienyl-zirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride. The metallocene compounds utilized within the embodiment of this art can be used as crystalline solids, as solutions in aromatic hydrocarbons or in a supported form.

Multiple dry impregnations or carrier infusion steps can be undertaken. That is, the step of alumoxane impregnation of the carrier, without slurry formation, can be undertaken, drying the pores under the conditions specified above can be undertaken thereafter; these two stages can be repeated one or more times to increase the alumoxane or alumoxane/metallocene content of the catalyst. Multiple infusion/drying steps are undertaken so that relatively higher levels of alumoxane may be impregnated within the silica pores without forming a layer of an alumoxane coating on the external surface of the carrier.

In the second infusion, dry impregnation, a solution can contain an alumoxane alone in solution or a solution of alumoxane and metallocene compound together.

As stated above, the alumoxane can be impregnated into the carrier at any stage of the process of catalyst preparation. When the catalyst contains two transition metals components, one of which is a metallocene, and one of which is a non-metallocene compound (free of unsubstituted or substituted cyclopentadienyl groups) the impregnation of the alumoxane in accordance with the unique method described above is preferably undertaken after hydroxyl groups of the carrier material are reacted with an organomagnesium compound and the non-metallocene transition metal compound. In this embodiment, the amount of Al, provided by alumoxane, is sufficient to provide an Al:transition metal (provided by metallocene) mole ratio ranging from 50 to 500, preferably 75 to 300. The carrier material, having said (OH) groups, is Slurried in a non-polar solvent and the resulting slurry is contacted with at least one organomagnesium composition having the empirical formula below. The slurry of the carrier material in the solvent is prepared by introducing the carrier into the solvent, preferably while stirring, and heating the mixture to about 25° to about 70° C., preferably to about 40° to about 60° C. Temperatures here are critical with respect to the non-metallocene transition metal which is subsequently added; that is temperatures in this slurry of above 90° C. result in deactivation of the non-metallocene transition metal added subsequently. The slurry is then contacted with the aforementioned organomagnesium composition, while the heating is continued at the aforementioned temperature.

The organomagnesium composition has the empirical formula $$R_m \, Mg \, R'_n$$

where R and R' are the same or different $C_2$–$C_{12}$ alkyl groups, preferably $C_4$–$C_{10}$ alkyl groups, more preferably $C_4$–$C_8$ alkyl groups, and most preferably both R and R' are mostly butyl groups, and m and n are each 0, 1 or 2, providing that m+n is equal to the valence of Mg.

Suitable non-polar solvents are materials in which all of the reactants used herein, i.e., the organomagnesium composition, and the transition metal compound, are at least partially soluble and which are liquid at reaction temperatures. Preferred non-polar solvents are alkanes, such as isopentane, isohexane, n-heptane, octane, nonane, and decane, although a variety of other materials including cycloalkanes, such as cyclohexane, aromatics, such as benzene, toluene and ethylbenzene, may also be employed. The most preferred nonpolar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium composition that will be deposited physically or chemically—onto the support since any excess of the organomagnesium composition in the solution may react with other synthesis chemicals and precipitate outside of the support. The carrier drying temperature affects the number of sites on the carrier available for the organomagnesium composition—the higher the drying temperature the lower the number of sites. Thus, the exact molar ratio of the organomagnesium composition to the hydroxyl groups on the carrier will vary arid must be determined on a case-by-case basis to assure that only so much of the organomagnesium composition is added to the solution as will be deposited onto the support without leaving any excess of the organomagnesium composition in the solution. Furthermore, it is believed that the molar amount of the organomagnesium composition deposited onto the support is greater than the molar content of the hydroxyl groups on the support. Thus, the molar ratios given below are intended only as an approximate guideline and the exact amount of the organomagnesium composition in this embodiment must be controlled by the functional limitation discussed above, i.e., it must not be greater than that which can be deposited onto the support. If greater than that amount is added to the solvent, the excess may react with the non-metallocene transition metal compound, thereby forming a precipitate outside of the support which is detrimental in the synthesis of our catalyst and must be avoided. The amount of the organomagnesium composition which is not greater than that deposited onto the support can be determined in any conventional manner, e.g., by adding the organomagnesium composition to the slurry of the carrier in the solvent, while stirring the slurry, until the organomagnesium composition is detected in the solvent.

For example, for the silica carrier heated at about 600° C., the amount of the organomagnesium composition added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium composition dissolves in the non-polar solvent-to form a solution from which the organomagnesium composition is deposited onto the carrier.

It is also possible to add such an amount of the organomagesium composition which is in excess of that which will be deposited onto the support, and then remove, e.g., by filtration and washing, any excess of the organomagnesium composition. However, this alternative is less desirable than the most preferred embodiment described above.

The organomagnesium treated support is contacted with an organic alcohol reagent (ROH) containing RO- groups which are reactive or capable of displacing alkyl groups on the magnesium. The amount of this organic alcohol reagent is effective to provide a ROH:Mg ratio of 0.5 to 2.0, preferably 0.8 to 1.5.

Contact of the silica supported magnesium compound, with the organic alcohol reagent is undertaken in the slurry. Contact is undertaken at a temperature ranging from 25° C. to 80° C., preferably 40° C. to 70° C.

The alkyl group in the organic alcohol reagent can contain 1 to 12 carbon atoms, preferably 1 to 8; in the embodiments below, it is an alkyl containing 2 to 4 carbon atoms, particularly of 4 carbon atoms (butyl). The inclusion of the alcohol reagent step in the catalyst synthesis of the invention produces a catalyst which, relative to the absence of this step, is much more active, requires much less non-transition metal (e.g. titanium), and is much more active with respect to the product component produced with the metallocene-transition metal component. After the addition of the organic alcohol reagent to the slurry is completed, the slurry is contacted with a non-metallocene transition metal compound, free of substituted or unsubstituted cyclopentadienyl groups.

The slurry temperature must be maintained at about 25° to about 70° C., preferably to about 40° to about 60° C. As noted above, temperatures in this slurry of about 90° C. or greater may result in deactivation of the non-metallocene transition metal. Suitable non-metallocene transition metal compounds used herein are compounds of metals of Groups IVA, and VA, of the Periodic Chart of the Elements, as published by the Fisher Scientific Company, Catalog No. 5-702-10, 1978, providing that such compounds are soluble in the non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred non-metallocene transition metal compounds are titanium compounds, preferably tetravalent titanium compounds. The most preferred titanium compound is titanium tetrachloride. The amount of titanium or vanadium, in non-metallocene form ranges from a Ti/Mg molar ratio of 0.3 to 1.5, preferably from 0.50 to 0.80.

Mixtures of such non-metallocene transition metal compounds may also be used and generally no restrictions are imposed on the transition metal compounds which may be included. Any transition metal compound that may be used alone may also be used in conjunction with other transition metal compounds.

Incorporation of the alumoxane-metallocene can be directly to this slurry. Alternatively, and in accordance with the unique method of infusion of alumoxane into the pores of the carrier, descibed above, the carrier slurry can be stripped of solvent, after the addition of the non-metallocene transition metal compound, to form a free-flowing powder. The free flowing powder can then be impregnated by determining the pore volume of the carrier and providing an alumoxane (or metallocene-alumoxane) solution in a volume equal to or less than that of the pore volume of the carrier, and recovering a dry catalyst precursor. The resulting free-flowing powder, referred to herein as a catalyst precursor, is combined with an activator (sometimes referred to as a cocatalyst). The cocatalyst can be a trialkylaluminum, free of alumoxane. Preferably, trimethylaluminum (TMA) is the cocatalyst or activator. The amount of the TMA activator is sufficient to give an Al:Ti molar ratio of about 10:1 to about 1000:1, preferably about 15:1 to about 300:1, and most preferably about 20:1 to about 100:1. The catalyst exhibits high activity for long periods of time in the pilot plant, and exhibits little deactivation.

The catalyst precursor of this invention comprises a metallocene compound and an alumoxane which is fed to the fluidized bed reactor for gas phase polymerizations and copolymerizations of ethylene in particulate form. Moreover, in accordance with the invention, the cocatalyst or activator is fed to the fluidized bed reactor for polymerizations and copolymerizations of ethylene in the absence of alumoxane solution as a cocatalyst.

EXAMPLES

Example 1

Solution (A): To a 50 ml serum-bottle 0.140 grams of $Cp_2ZrCl_2$ was transferred and then 10.2 grams of a methylalumoxane (13.2 wt. % Al) solution were added. The solution remained at room temperature for 60 minutes until the entire contents were transferred to the silica slurry described below.

Into a 100 ml pear flask equipped with a magnetic stirring bar, 3.0 grams of Davison 955 silica calcined at 600°, was added followed by addition of about 20 ml dry toluene. The flask was placed into a 59° C. oil bath. Next, 2.9 ml of dibutylmagnesium (0.74 mmol/ml) was added to the silica/toluene slurry. The contents of the flask were stirred for 25 minutes. Then, 2.3 mls of a 0.94 molar titanium tetrachloride solution in heptane was added to the flask. The slurry turned a dark brown color and stirring was continued for 25 minutes. Finally, the entire contents of solution (A) was transferred into the catalyst preparation flask, and the slurry was allowed to stir for 10 minutes. After this time, all solvents were removed by evaporation under a nitrogen purge. Catalyst yield was 5.6 grams of a dark-brown free-flowing powder. The Al/Zr ratio was 104.

Example 2

Ethylene/1-hexene copolymer was prepared with the catalyst of the foregoing example under polymerization conditions to produce high density polyethylene (HDPE), with a flow index ($I_{21}$) of about 6.

A 1.6 liter stainless steel autoclave, at about 50° C., was filled with 0.750 liters of dry heptane, 0.030 liters of dry 1-hexene and 4.0 mmols of trimethylaluminum (TMA) while under a slow nitrogen purge. The reactor was closed, the stirring rate was set at about 900 rpm, the, internal temperature was increased to 85° C., and the internal pressure was raised from 7 psi to 10 psi with hydrogen. Ethylene was introduced to maintain the reactor pressure at about 203 psi. Next, 0.0639 grams of catalyst was introduced into the reactor with ethylene over pressure and the temperature was increased and held at 95° C. The polymerization was continued for 60 minutes, and then the ethylene supply was stopped and the reactor allowed to cool to room temperature. 78 grams of polyethylene were collected.

The molecular weight distribution (MWD) of the polymer was examined by Gel Permeation Chromatography (GPC), and the results clearly show that the polymer has a bimodal MWD (FIG. 2). FIG. 3 shows the GPC chromatogram for a HDPE polymer prepared in tandem gas phase reactor. Comparison of the two GPC chromatograms clearly shows that the polymer prepared in a single reactor is essentially the same as the polymer prepared in two tandem reactors.

Presently, commercial samples of HDPE with a bimodal MWD are produced in a tandem reactor process. In that process, two reactors are run in series and the catalyst is exposed to ethylene polymerization conditions in one reactor, and the resulting polymer-catalyst particles are transferred to a second reactor for additional polymerization. One of the main process differences in the two different reactors, is that the amount of hydrogen is different in the two different reactors. Relatively lower molecular weight product is produced in the reactor containing more hydrogen, because the hydrogen acts as a chain transfer agent; whereas relatively higher molecular weight product is produced in the reactor containing lesser relative amounts of hydrogen.

Example 3

This catalyst was prepared in two stages. 495 grams of Davison grade 955 silica, previously calcined with dry nitrogen for about 12 hours at 600° C., was added to a 2 gallon stainless steel autoclave under a slow nitrogen purge to eliminate oxygen and moisture from the catalyst preparation vessel. Then, 4.0 liters of dry isopentane (IC5) was added to the autoclave and the silica/IC5 were slurried at about 100 rpm and the internal temperature was maintained at about 55°–60° C. Next, 469 ml of a 0.76 molar solution of dibutylmagnesium in heptane was added to the silica/IC5 slurry and stirring was continued for 60 minutes. Next, 39.1 ml of neat titanium tetrachloride was diluted with about 40 ml of IC5 and this solution was added to the autoclave and stirring was continued for 60 minutes. Finally, the solvents were removed with a nitrogen purge through a vent line and 497 grams of a brown free-flowing powder were obtained. Ti found was 2.62 wt %; Mg found was 1.33 wt % and Ti/Mg molar ratio was 1.0.

492 grams of the product of the first stage was added to a 1.6 gallon glass catalyst preparation vessel fitted with a temperature jacket and an internal stirrer. Then into a stainless steel Hoke bomb was added 13.93 grams of (BuCp)2ZrCl2 (34.4 mmol Zr) and 717.5 ml of a methylalumoxane solution (3,444 mmol of Al) in toluene (4.8 Molar). Note: The total volume of the methylalumoxane/toluene solution is approximately equal to the total pore volume of the product of the first step. Next, the toluene solution containing the methylalumoxane and the zirconium compound were mixed and then the solution was added to the product of the first step in approximately 5 ml aliquots over 90 minutes; (during this time, the product of the first step remains completely dry and always consists of a free-flowing powder). Finally, nitrogen is purged through the glass vessel for about 5 hours with the jacket temperature at about 45° C. Yield: 877 grams of a free-flowing powder. Ti found was 1.85 wt %; Zr found was 0.30 wt %.

Example 4

The catalyst described in Example 3 was examined in a pilot plant fluidized bed gas phase reactor under the following conditions:

ethylene 180 psi
hydrogen/ethylene 0.005–0.008
hexene/ethylene 0.015
reactor temperature 95° C.

The resin prepared at a productivity of about 1400 g polymer/g catalyst had the following characteristics:

average particle size 0.017 inches
resin metal content 13.0 ppm
HLMI (I21) 5.3
MFR (I21/I2.16) 113
Density 0.949 g/cc The GPC curve of this product is in FIG. 4 [solid line] and is compared to a commercially produced tandem unit in a two stage process, in which a different molecular weight component is made in each stage [dotted line in FIG. 4.]

Properties of films of the product of Example 4 [solid line in FIG. 4] are compared to the commercially produced product [dotted line in FIG. 4] OxyChem L5005.

| Example 4 | | |
| --- | --- | --- |
| Sample | Ti/Zr | OxyChem L5005 |
| $I_{21}$ | 5.3 | 8.0 |
| MFR | 113 | 160 |
| Density | 0.949 | 0.950 |
| Throughput, lb/hr | 98 | 120 |
| Melt Pressure (at 120 lb/hr), psi | 7550 | 6450 |
| FQR | 15 | 15 |
| Dart Drop, 1 mil. g | 565 | 325 |
| 0.5 mil, g | 410 | 420 |
| MD Elmendorf Tear, 0.5 mil. g/mil | 37 | 25 |

The results in the GPC curve of FIG. 4 show that the Example 4 bimodal MWD product [solid line] has a high molecular weight component with higher molecular weight than that produced in the tandem two reactor process. The film of Example 4 is substantially reduced in, if not free of, gel content. The film of the Example 4 product has improved dart impact strength.

Example 5

Titanium Catalyst Component Preparation.

541 grams of Davison grade 955-[600° C. calcination temperature] silica was weighed into a two-gallon stainless steel autoclave containing a stirring paddle. Next, ca. 4.8 liters of dry isopentane was added to the autoclave and the stirring rate was set at 100 rpm. The temperature of the silica/isopentane slurry was 54°–58° C. Next, 546 mls of dibutylmagnesium (0.713 mmol/ml) was added to the slurry. The contents of the autoclave were stirred for 60 minutes. Then, 35.6 mls of neat 1-butanol were added and stirring was continued for one hour. Finally, 21.4 mls of titanium tetrachloride was added to the autoclave and stirring continued for 60 minutes. After this time, all solvents were removed by evaporation under a nitrogen purge. Catalyst yield was 496 grams of a tan free-flowing powder. Ti found 1.48 wt %; Mg found 1.48 wt. %.

Example 6

Solution B: 12.95 grams of (BuCp)$_2$ZrCl$_2$ was transferred to a one-liter bottle and 687 ml of a 4.67 Molar (13.7 wt. % Al) solution of methylalumoxane were added. The bottle was shaken for about one minute to form a yellow solution which was transferred into a 1.5 liter stainless steel hoke bomb and used immediately as described below.

Under an inert atmosphere, 465 grams of the titanium-containing catalyst described in Example 5 was added to a 2 gallon, glass-reactor vessel containing a helical stirrer to agitate the catalyst powder and a temperature jacket which was set at about 30° C. The stirrer was set at 125 rpm. Then, the contents of the hoke bomb (solution B) was added to the titanium-containing catalyst in approximately 5–10 ml aliquots every 30–60 seconds over a 45 minute period. The total volume of solution (B) used was such that the titanium containing catalyst always appeared "dry" during the entire addition time. However, during this addition time, the light tan titanium-containing catalyst turned a dark brown color. After the addition of solution (B) was complete, the jacket temperature was set at 45° C. and the residual toluene was removed with a nitrogen purge for 5 hrs. After this time the catalyst was a dark brown free-flowing powder. Analytical results: Mg, 0.99 wt. %; Ti, 0.96 wt. %; Al, 11.09 wt. % and Zr, 0.43 wt. %.

Example 7

Polymerization—Slurry

Ethylene/1-hexene copolymer was prepared with the catalyst composition of Example 6 to produce HDPE with a relatively high molecular weight.

A 1.6 liter stainless steel autoclave, at about 47° C. was filled with 0.750 liters of dry hexane, 0.030 liters of dry 1-hexene and 4.0 mmols of trimethylaluminum (TMA) was added while under a slow nitrogen purge. The reactor was closed, the stirring rate was set at about 900 rpm, the internal temperature was increased to 85° C. and the internal pressure was raised from 7 psi to 13 psi with hydrogen. Ethylene was introduced to maintain the reactor pressure at about 200 psi. Next, 0.0244 grams of catalyst composition of Example 6 was introduced into the reactor with ethylene over-pressure and the temperature was increased and held at 95° C. The polymerization was continued for 60 minutes, and then the ethylene supply was stopped and the reactor allowed to cool to room temperature. 36.6 grams of polyethylene were collected. The HLMI of the polymer was 4.3 indicating a relatively high molecular weight.

Example 8

Polymerization—Gas Phase Fluidized Bed Reactor

The catalyst of Example 6 was added to a fluidized bed gas phase reactor under the following conditions:

Ethylene 185 psi $H_2/C_2$ 0.009

Hexene/ethylene 0.013

Reactor Temp. 90° C.

Cocatalyst TMA (trimethylaluminum) 300 ppm based on ethylene feed based on ethylene feed Example 9

Product—Alpine Film Line

Polymer produced in Example 8 with a HLMI of 5.9, MFR of 128, which gave a GPC chromatogram with a HMW/LMW ratio of 64.2/35.8, was fabricated into HDPE film at 0.5 and 1.0 mil. The impact data is shown below:

| RESIN | FI/MFR (*) | 1.0 mil Dart Drop | 0.5 mil Dart Drop |
|---|---|---|---|
| Example 4 herein | 5/111 752 | 415 | |
| Tandem Reactors | 7/110 275 | 395 | |

(*)values for pellets obtained after stabilizer package was added to grannular resin Example 10

(A)—Titanium component: At ambient temperature, 509 grams of a Davison grade 955 silica, previously dried at 600° C., was added to a 2-gallon stainless steel catalyst preparation vessel under a slow nitrogen purge. Four liters of dry isopentane was added to the vessel to form a silica/isopentane slurry and the stirring rate was adjusted to 100 rpm. The temperature of the slurry was set at about 55° C. and a solution of dibutylmagnesium in heptane (366 mmol Mg) was added and stirring was continued for 70 minutes. Then, 439 mmol of 1-butanol was added. After 65 minutes, 256 mmol of $TiCl_4$ was added and stirring continued for 60 minutes. Finally, the solvents were removed by evaporation with a nitrogen purge. 518 grams of a white, free-flowing powder were obtained. Analytical: Ti, 1.89 wt %; Mg, 1.36 wt %.

(B)—Zirconium component: 490 grams of the product prepared in Part A was added to a 2-gallon glass catalyst preparation vessel fitted with a temperature jacket and an internal stirrer. The entire contents of solution (B) described below was added to the part A product in 5–10 ml aliquots, which were added in about 1 minute intervals. 1.79 ml of solution (B) was used per gram of the titanium component. Finally, the jacket temperature was set at 45° C. and residual toluene was removed under a nitrogen purge. 642 grams of a dark brown powder were obtained. Analytical: Ti, 1.17 wt %; Mg, 0.85 wt %; Al, 13.5 wt %; and Zr, 0.43 wt %.

Solution (B)—Under an inert atmosphere, 16.85 grams of $(BuCp)_2ZrCl_2$ was added to a 1-liter glass bottle followed by 877 mls of a 4.75 Molar (Al) methylalumoxane solution (in toluene). The bottle was closed and shaken vigorously for about one minute to dissolve all solids. The contents of the flask were transferred to a 1.5 liter stainless steel Hoke bomb and added to the part A product as described above.

Example 11

(A)—Titanium component: At ambient temperature, 500 grams of a Davison grade 955 silica, previously dried at 600° C., was added to a 2-gallon stainless steel catalyst preparation vessel under a slow nitrogen purge. Four liters of dry isopentane was added to the vessel to form a silica/isopentane slurry and the stirring rate was adjusted to 100 rpm. The temperature of the slurry was set at about 55° C. and a solution of dibutylmagnesium in heptane (352 mmol Mg) was added and stirring was continued for 60 minutes. Next, 359 mmol $TICl_4$ was added and stirring continued for 60 minutes. Finally, the solvents were removed by evaporation with a nitrogen purge. 604 grams of a white, free-flowing powder were obtained. Analytical: Ti, 3.03 wt %; Mg, 1.54 wt %.

(B)—Zirconium component: 378 grams of the product prepared in Part A was added to a 2 gallon glass catalyst preparation vessel fitted with a temperature jacket and an internal stirrer. The entire contents of solution (B) (described below) was added to the part A product in 5–10 ml aliquots. The aliquots were added in about 1 minute intervals. 2.03 ml of solution (B) was used per gram of the titanium component. Finally, the jacket temperature was set at 45° C. and residual toluene was removed under a nitrogen purge. 498 grams of a dark brown powder were obtained. Analytical: Ti, 1.42 wt %; Mg, 0.78 wt %; Al, 11.9 wt %; and Zr, 0.43 wt %.

Solution (B)—Under an inert atmosphere, 14.5 grams of $(BuCp)_2ZrCl_2$ was added to a 1-liter glass bottle followed by 69 mls of a 4.67 Molar (Al) methylalumoxane solution (in toluene). The bottle was closed and shaken vigorously for about one minute to dissolve all solids. The contents of the flask were transferred to a 1.5 liter stainless steel Hoke bomb and added to the part A product as described above.

Example 12

Raw materials used in catalyst preparation included 504 g of Davison grade 952–1836 silica, 677 g of methylalumoxane in toluene solution (30 wt. % MAO), 7.136 g of bis(n-butylcyclopentadienyl)zirconium dichloride.

The steps of the catalyst preparation are set forth below:
1. Dehydrate the 952–1836 silica at 250° C. for 4 hours using air to purge. Then purge with nitrogen on cooling.
2. Transfer the silica to a mix-vessel.
3. Add 7.136 g of bis(n-butylcyclopentadienyl) zirconium dichloride and 677 g of methylalumoxane to a bottle.
4. Agitate the catalyst solution in the bottle until the metallocene dissolves in the MAO solution.
5. Transfer the MAO and metallocene solution into the mix-vessel containing the dehydrated 952–1836 silica slowly while agitating the silica bed vigorously to make sure that the catalyst solution is well dispersed into the silica bed.
6. After the addition, continue to agitate the catalyst for ½ hours.
7. Start drying the catalyst by purging with nitrogen for 5 hours at 45° C.
8. Sieve the catalyst to remove particles larger than 150 micron.
9. The catalyst has the following analysis:
Yield=767 g catalyst (from 500 g of silica)
Al=9.95 wt. %
Zr=0.19 wt. %

Example 13

Produce a polymer for low density film, 0.918 g/cc, 1.0 MI, 17 MFR, in a fluidized bed, gas phase reactor using the following process conditions:
Process Conditions:

Fluidization velocity 1.7 ft/sec

Residence time 2.5 hours

Temperature 84° C.

Ethylene 220 psi

Hexene 3.6 psi

Isopentane 50 psi

Carbon dioxide 3 ppm

Ash 200 to 250 ppm

The catalyst was that of Example 12.

COMPARATIVE EXAMPLES

Comparative Example 1

A zirconium catalyst was tested in a slurry reactor at 85° C. with 130 psi ethylene partial pressure. A hexene/ethylene gas ratio of 0.03 was used. MAO/toluene solution (12 wt. %, 2 ml) was added to the reactor. Productivity of 800 g resin/g catalyst/hr was measured.

The same catalyst system was tested in the fluidized bed reactor at 90° C. with 200 psi ethylene partial pressure. A 0.025 hexene to ethylene gas ratio was used. A feed rate of 150 to 200 cc/hr of 2 wt % MAO/toluene solution was employed. The MAO solution was added below the distributor plate. Even at very high MAO/toluene feed rates, catalyst productivity was only 220 g resin/g catalyst/hr. In addition, the reactor had to be shut down due to a fouled plate only 18 hours after the MAO feed was started.

This example illustrates that it is more effective to activate zirconium catalysts prior to introduction into a gas phase reactor. It also illustrates the fouling problems experienced when MAO solutions are added to the gas-phase reactor.

Comparative Example 2

A titanium/zirconium mixed metal catalyst was tested in the fluidized bed reactor. At 150 psi ethylene partial pressure at 90° C. a 0.04 hexene to ethylene gas ratio was employed, and a hydrogen to ethylene gas ratio was 0.045. A 2 wt % solution of MAO in toluene was added beneath the fluidized bed distributor plate. Resin flow index and GPC curve analysis showed that the zirconium catalyst sites were active, and the Ti:Zr productivity ratio was 7:3. However, the reactor had to be shut down within 24 hours because the distributor plate had fouled.

Comparative Example 3

The same titanium/zirconium catalyst used in Example 2 was tested in the fluidized bed reactor. It was run at 90° C. with 150 psi ethylene partial pressure. A 0.03 hexene to ethylene gas ratio was used and a hydrogen to ethylene ratio was 0.04. A solution of 2 wt % MAO in toluene was added directly into the bed at the rate of 200 cc/hr. The resin flow index and molecular weight distribution showed definitively that the zirconium sites were active with a Ti:Zr productivity ratio of 3:7. In the process of running this test, though, a very large chunk grew around the injection port causing a shutdown.

This example demonstrates that relative zirconocene catalyst activity is significantly higher when there is better contact between the MAO/toluene droplets and the catalyst sites. It also verifies that fouling also occurs when the MAO solution is added to the reactor directly into the fluidized bed of polymer.

Comparative Example 4

The catalyst used in examples 2 and 3 was re-run under the same conditions used in example 3. The MAO feed rate was the same as well. During this test, though, the MAO was dispersed into a 10 lb/hr ethylene gas stream using an ultrasonic atomizer. The atomizer dispersed the MAO solution into very small (40 micron) droplets.

Enough gas was used so that the toluene evaporated from the MAO. The gas flow rate was determined in an off-line test using toluene alone. The resin produced during this test showed no evidence of activity from the zirconium sites. In addition, there were no signs of reactor fouling after an extended period of running.

This example proves that it is the presence of liquid in the reactor that is responsible both for the activation of the zirconium and the fouling of the reactor.

Thus it is apparent that there has been provided, in accordance with the invention, a process that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed:

1. A process for supporting alumoxane and derivatives thereof on a support, wherein the process comprises providing a sample comprising a support of silica wherein the sample has a total pore volume; and wherein the support has a pore volume of 0.5 to 5.0 cc/g and has pores of an average diameter of about 50 to 500 angstroms;

providing a solution comprising an alumoxane and a solvent for said alumoxane, wherein said solution has a volume in a range of from in excess of the total pore volume of the sample and to less than about twice the total pore volume of the sample, and wherein the volume of said solution is less than that required to form a slurry of said sample in said solution;

wherein the alumoxane is characterized by a formula (a) and/or (b), wherein (a) is R—(Al(R)—O)$_x$—AlR$_2$ for linear alumoxanes and (b) (—Al(R)—O)$_y$ for cyclic alumoxanes and wherein x is 1 to 40, y is 3–40 and R is a $C_1$–$C_8$ alkyl group wherein the solution has a concentration of alumoxane expressed as Al weight percent which ranges from 5 to 20, wherein the alumoxane provides aluminum in an amount sufficient to provide a ratio of Al to silica (wt/wt) from 0.10 to 0.40;

contacting the sample with said volume of said solution and allowing the solution to impregnate the pores of support, after said contacting recovering particles of support impregnated with alumoxane.

2. The process of claim 1, which further comprises heating the particles to remove solvent from the pores under temperature conditions effective to prevent degradation of the alumoxane.

3. The process of claim 2, wherein the temperature ranges from above 30° to below 60° C.

4. The process of claim 1, wherein the solution further comprises a metallocene compound.

5. The process of claim 4, which further comprises adding, to said volume of solution prior to said contacting, at least one metallocene compound of the formula: $Cp_m$-$MA_nB_p$ wherein Cp is a cyclopentadienyl or a substituted cyclopentadienyl group;

m is 1 or 2;

M is zirconium or hafnium; and each of A and B is selected from the group consisting of a halogen atom, a hydrogen atom and an alkyl group, providing that m+n+p is equal to the valence of the metal M; wherein the metallocene compound is admixed with an amount of a methylalumoxane effective to activate the metallocene compound to form a catalyst.

6. The process of claim 5, wherein the metallocene compound is selected from the group consisting of bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls.

7. The process of claim 6, wherein the metallocene compound is selected from the group consisting of bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, bis(dimethylcyclopentadienyl) zirconium dichloride, cyclopentadienyl-zirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride.

8. The process of claim 7, wherein the solution has a composition which provides a molar ratio of alumoxane, expressed as aluminum, to metallocene ranging from 50 to 500.

9. The process of claim 8, wherein the alumoxane is methylalumoxane.

10. The process of claim 9, which further comprises heating the particles to remove solvent from the pores under temperature conditions effective to prevent degradation of the alumoxane.

11. The process of claim 10, wherein the temperature ranges from above 30° to below 60° C.

12. The process of claim 1, wherein the sample further comprises $TiCl_4$, wherein the $TiCl_4$ is deposited in said pores.

13. The process of claim 12, wherein the sample further comprises a source of magnesium.

14. The process of claim 13, wherein the sample is formed by contacting the silica with a dialkylmagnesium, in which the alkyl contains 1 to 8 carbon atoms to form a first intermediate; contacting the first intermediate with an alcohol in which the R"OH/Mg ratio is 0.50 to 2.0 in which R" is alkyl of 1 to 10 carbon atoms to form a second intermediate.

15. The process of claim 14, wherein the second intermediate is contacted with $TiCl_4$.

16. The process of claim 15, wherein the sample is dry and wherein it is formed by providing silica which contains reactive hydroxyl groups; contacting said hydroxyl groups on said silica with an amount of $R_aMgR'_b$ wherein R and R' are the same or different $C_2$–$C_8$, alkyl groups, and a and b are each 0, 1, or 2, providing that a+b is equal to the valence of Mg, and wherein the amount of $R_aMgR'_b$ is sufficient to provide a Mg:OH molar ratio which ranges from 0.5:1 to 4:1; and adding butanol to said $R_aMgR'_b$ contacted hydroxyl groups and thereafter introducing said non metallocene transition metal compound to said second intermediate recovering dry particles for use as said sample.

17. The process of claim 16, wherein the solution further comprises a metallocene compound.

18. The process of claim 17, which further comprises adding, to said volume of solution prior to said contacting, at least one metallocene compound of the formula: $Cp_m$-$MA_nB_p$ wherein Cp is a cyclopentadienyl or a substituted cyclopentadienyl group;

m is 1 or 2;

M is zirconium or hafnium; and each of A and B is selected from the group consisting of a halogen atom, a hydrogen atom and an alkyl group, providing that m+n+p is equal to the valence of the metal M; wherein the metallocene compound is admixed with an amount of a methylalumoxane effective to activate the metallocene compound to form a catalyst.

19. The process of claim 18, wherein the metallocene compound is selected from the group consisting of bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis-(indenyl)metal dihalides wherein the metal is zirconium or hafnium, halide groups are preferably chlorine and the alkyl groups are $C_1$–$C_6$ alkyls.

20. The process of claim 19, wherein the metallocene compound is selected from the group consisting of bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, bis(dimethylcyclopentadienyl) zirconium dichloride, cyclopentadienyl-zirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl] zirconium dichloride.

21. The process of claim 20, wherein the solution has a composition which provides a molar ratio of alumoxane, expressed as aluminum, to metallocene ranging from 50 to 500.

22. The process of claim 21, wherein the alumoxane is methylalumoxane.

23. A process for supporting alumoxane and derivatives thereof on a support, without forming a slurry of the support during the deposition of alumoxane on the support, wherein the process comprises (1) providing a sample comprising a support of silica wherein the sample has a total pore volume; and wherein the support has a pore volume of 0.5 to 5.0 cc/g and has pores of an average diameter of about 50 to 500 angstroms;

(2) providing a volume of a solution of an alumoxane and a solvent for said alumoxane,
   wherein the volume of said solution is in a range of from about equal to the total pore volume of the sample and less than about twice the total pore volume of the sample and; wherein the volume of said solution is less than that required to form a slurry of said sample in said solution;
   wherein the alumoxane is of formula (a) and/or (b), wherein (a) is R—(Al(R)—O)$_x$—AlR$_2$ for linear alumoxanes and (b) (—Al(R)—O)$_y$ for cyclic alumoxanes and wherein x is 1 to 40, y is 3–40 and R is a $C_1$–$C_8$ alkyl group
   wherein the solution has a concentration of alumoxane expressed as Al weight percent which ranges from 5 to 20,
   wherein the alumoxane provides aluminum in an amount sufficient to provide a ratio of Al to silica (wt/wt) from 0.10 to 0.40;

(3) contacting the sample with said volume of said solution and allowing the solution to impregnate the pores of support, without forming a slurry of the support in the solvent;

(4) after said contacting recovering particles of support impregnated with alumoxane (5) providing a second sample comprising said particles of impregnated support of (4);

(6) providing a second volume of a solution of an alumoxane and a solvent for said alumoxane,
   wherein the second volume of said solution ranges from less than the second total pore volume of the second sample to less than about twice the second total pore volume of the said second sample and
   wherein the second volume of said solution is less than that required to form a slurry of said second sample in said solution;
   wherein the alumoxane is of formula (a) and/or (b), wherein (a) is R—(Al(R)—O)x—AlR$_2$ for linear alumoxanes and (b) (—Al(R)—O)$_y$ for cyclic alumoxanes and wherein x is 1 to 40, y is 3–40 and R is a $C_1$–$C_8$ alkyl group
   wherein the solution of said second volume has a concentration of alumoxane expressed as Al weight percent which ranges from 5 to 20,
   wherein the alumoxane provides aluminum in an amount sufficient to provide a ratio of Al to silica (wt/wt) from 0.10 to 0.40;

(7) contacting the second sample with said second volume of said solution and allowing the solution to impregnate the pores of dry particles, without forming a slurry of the dry particles in the solvent;

(8) after said contacting of (7), recovering dry particles of support impregnated with alumoxane, which dry particles are characterized by a third total pore volume and a third pore volume.

24. The process of claim 23, which further comprises heating the particles to remove solvent from the pores under temperature conditions effective to prevent degradation of the alumoxane.

25. The process of claim 24, wherein the temperature ranges from above 30° to below about 60° C.

26. The process of claim 23, wherein the second volume of said solution further comprises a metallocene compound.

27. The process of claim 23, which further comprises adding, second to said volume of solution prior to said contacting, at least one metallocene compound of the formula: Cp$_m$MA$_n$B$_p$ wherein Cp is a cyclopentadienyl or a substituted cyclopentadienyl group;

m is 1 or 2;

M is zirconium or hafnium; and each of A and B is selected from the group consisting of a halogen atom, a hydrogen atom and an alkyl group, providing that m+n+p is equal to the valence of the metal M; wherein the metallocene compound is admixed with an amount of a methylalumoxane effective to activate the metallocene compound to form a catalyst.

28. The process of claim 27, wherein the metallocene compound is selected from the group consisting of bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis-(indenyl)metal dihalides wherein the metal is zirconium or hafnium, halide groups are preferably chlorine and the alkyl groups are $C_1$–$C_6$ alkyls.

29. The process of claim 28, wherein the metallocene compound is selected from the group consisting of bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, bis(dimethylcyclopentadienyl) zirconium dichloride, cyclopentadienyl-zirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride.

30. The process of claim 29, wherein the second volume of said solution has a composition which provides a molar ratio of alumoxane, expressed as aluminum, to metallocene ranging from 50 to 500.

31. The process of claim 30, wherein the alumoxane is methylalumoxane.

32. The process of claim 31, which further comprises heating the particles to remove solvent from the pores under temperature conditions effective to prevent degradation of the alumoxane.

33. The process of claim 32, wherein the temperature ranges from above 30° to below 60° C.

34. The process of claim 23, wherein the sample further comprises $TiCl_4$, wherein the second $TiCl_4$ is deposited in said pores.

35. The process of claim 34, wherein the second sample further comprises a source of magnesium.

36. The process of claim 35, wherein the first sample is formed by contacting the silica with a dialkylmagnesium, in which the alkyl contains 1 to 8 carbon atoms to form a first intermediate; contacting the first intermediate with an alcohol (R"OH) in which the ROH/Mg ratio is 0.50 to 2.0 to form a second intermediate.

37. The process of claim 36, wherein the second intermediate is contacted with $TiCl_4$.

38. The process of claim 37, wherein the first sample is dry and wherein it is formed by providing silica which contains reactive hydroxyl groups; contacting said hydroxyl groups on said silica with an amount of $R_aMgR'_b$ wherein R and R' are the same or different $C_2$–$C_8$ alkyl groups, and a and b are each 0, 1, or 2, providing that a+b is equal to the valence of Mg, and wherein the amount of $R_aMgR'_b$ is sufficient to provide a Mg:OH molar ratio which ranges from 0.5:1 ti 4:1; and adding butanol to said $R_aMgR'_b$ contacted hydroxyl groups and thereafter introducing said non metallocene transition metal compound to said second intermediate and recovering dry particles for use as said sample.

39. The process of claim 38, wherein the solution of said second volume further comprises a metallocene compound.

40. The process of claim 39, which further comprises adding, to said second volume of solution prior to said contacting, at least one metallocene compound of the formula: $Cp_mMA_nB_p$ wherein Cp is a cyclopentadienyl or a substituted cyclopentadienyl group;

m is 1 or 2;

M is zirconium or hafnium; and each of A and B is selected from the group consisting of a halogen atom, a,hydrogen atom and an alkyl group, providing that m+n+p is equal to the valence of the metal M; wherein the metallocene compound is admixed with an amount of a methylalumoxane effective to activate the metallocene compound to form a catalyst.

41. The process of claim 40, wherein the metallocene compound is selected from the group consisting of bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis-(indenyl)metal dihalides wherein the metal is zirconium or hafnium, halide groups are preferably chlorine and the alkyl groups are $C_1$–$C_6$ alkyls.

42. The process of claim 41, wherein the metallocene compound is selected from the group consisting of bis(cyclopentadienyl)zirconium dichloride, bis(cyclopentadienyl) hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, bis(dimethylcyclopentadienyl) zirconium dichloride, cyclopentadienylzirconium trichloride, bis(indenyl)zirconium dichloride, [bis(4,5,6,7-tetrahydro-1-indenyl)]zirconium dichloride, and ethylene-[bis(4,5,6,7-tetrahydro-1-indenyl)]zirconium dichloride.

43. The process of claim 40, wherein the solution of said second volume has a composition which provides a molar ratio of alumoxane, expressed as aluminum, to metallocene ranging from 50 to 500.

44. The process of claim 43, wherein the alumoxane is methylalumoxane.

* * * * *